UNITED STATES PATENT OFFICE.

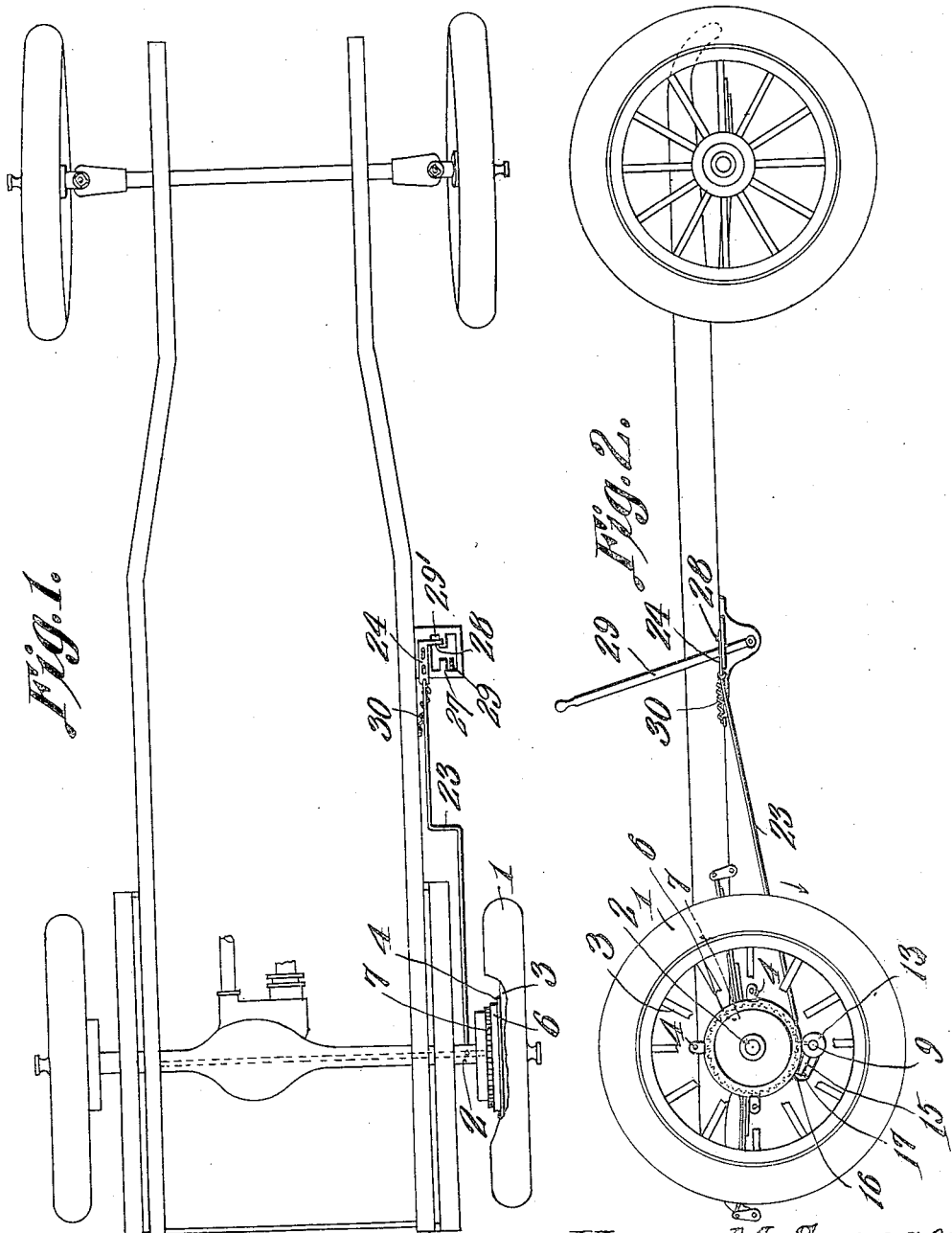

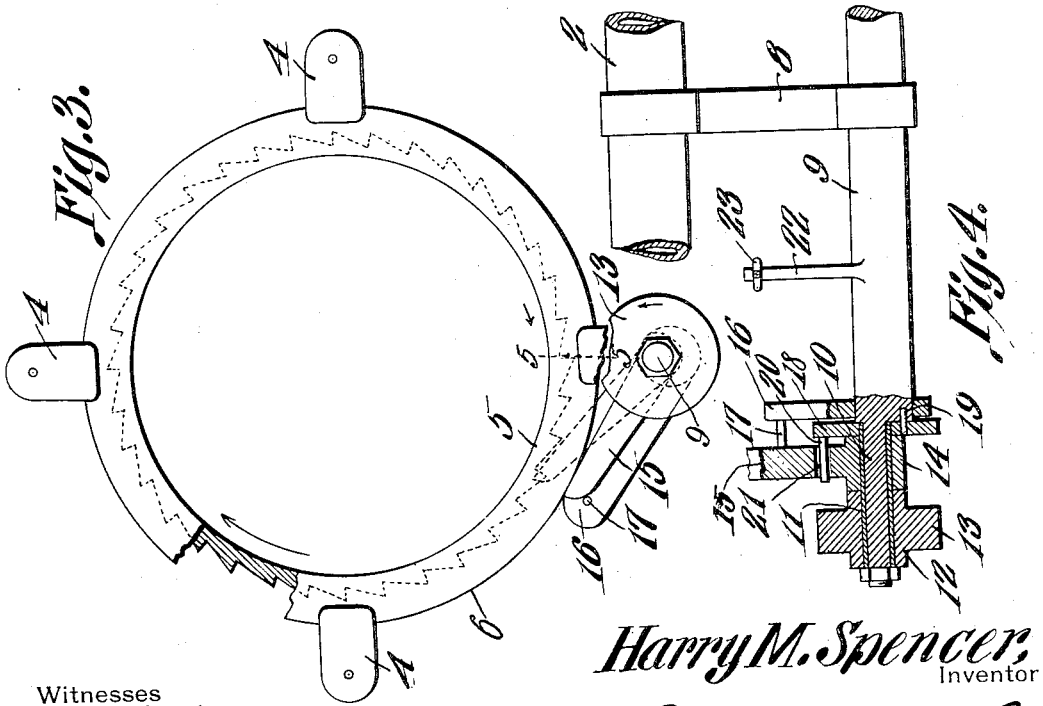

HARRY M. SPENCER, OF DUNMORE, PENNSYLVANIA.

EMERGENCY STOPPING DEVICE FOR MOTOR-CARS.

1,094,756.   Specification of Letters Patent.   Patented Apr. 28, 1914.

Application filed October 8, 1912. Serial No. 724,590.

*To all whom it may concern:*

Be it known that I, HARRY M. SPENCER, a citizen of the United States, residing at Dunmore, in the county of Lackawanna and State of Pennsylvania, have invented a new and useful Emergency Stopping Device for Motor-Cars, of which the following is a specification.

The present invention relates to improvements in emergency stopping devices.

One object of the present invention is the provision of a device adapted to be connected to one or any number of the wheels and axles of a motor car or vehicle, and so disposed, that in the event of the engine being stalled or stopped upon a grade, the slightest retrograde movement of the car or vehicle will automatically actuate the present device and stop the car or vehicle and thus avoid any inconvenience or accident due to such causes.

A further object of the invention is the provision of a novel means whereby when it is necessary to back a car or in other words use the reverse, the present device may be placed in inoperative position so as not to interfere with such reversal of the car or vehicle.

A still further object of the present invention is the provision of a novel means which under normal conditions is inoperative, but which will upon the slightest movement in the opposite direction be affected to actuate a means for stopping the wheels against rotation, the same being readily released upon the forward or desired movement of the car or vehicle.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a top plan view of an automobile chassis with the present invention applied to one of the rear wheels thereof. Fig. 2 is a side elevation of the same with the spokes and hub of such wheel broken away to clearly show the present device as applied. Fig. 3 is a side elevation of the device detached with the friction actuated pawl in operable relation thereto. Fig. 4 is a view partly in section and partly in elevation of the mounting of the operating and pawl carrying shaft and friction disk. Fig. 5 is a sectional view taken on the line 5—5 of Fig. 3 with the adjacent portion of the device in elevation. Fig. 6 is a top plan view of the mechanism disposed in co-active relation to the control lever and segment or plate of a motor vehicle to illustrate one means for preventing the operation of the present device when the motor vehicle is being intentionally reversed.

Referring to the drawings the numeral 1 designates one rear wheel of a motor vehicle which is mounted as usual upon the rear axle 2 and has attached to its spokes 3 upon the inner face of the wheel and about the usual brake band (not shown), by means of a plurality of fastening lugs 4, the annular member 5 which is constructed in the form of a flanged ring. This annular member 5, as clearly shown in Figs. 3 and 5, is provided with a plane peripheral surface 6 which constitutes a friction surface and with the recessed and toothed portion 7.

Hung from the axle, or in fact any other non-rotatable portion of the motor vehicle that may be found desirable, is a bracket 8 which has mounted therein for oscillation, a shaft 9, whose outer end 10 is formed eccentrically and has disposed thereupon for independent, slightly retarded, rotation, a sleeve 11 which is preferably made of an anti-friction metal, such as phosphor-bronze. Mounted for rotation upon this sleeve 11 is the hub 12 carrying the friction disk or wheel 13 which under normal conditions is disposed in contact with and rotated by the friction surface 6 of the annular hub carried member 5, the same normally rotating in the direction of the arrow as indicated in Fig. 3. Mounted for limited oscillation upon the sleeve 11 adjacent to the hub 12 is a sleeve 14 which has formed integral or in fixed relation thereto an arm 15 which constitutes a pawl or detent. This pawl 15 is disposed for movement into and out of engagement with the ratchet 7 of the annular hub carried member 5. Under normal conditions when the annular member 5 is rotating in the direction of the arrow as indicated in Fig. 3 causing the disk 13 to be rotated in the direction of the arrow, same figure, the pawl 15 will be moved— due to its riding upon the teeth 7—away from the teeth and will be limited in its downward movement by means of a pin 17 carried by the lug 16, which is held in proper fixed relation to pawl 15 upon the shaft 9 so as to always act as a limiting means for the pawl 15. By this construction it will be seen that while the annular member 5 is rotating in the proper direction as indicated by the arrow Fig. 3, the pawl 15 will not interfere with the rotation of the member 5, but that any rotation of the member 5 in the opposite direction, as for instance, a backward movement of the vehicle down grade, will cause the surface 6 to rotate the disk 13 in the opposite direction and as the friction between the hub or sleeve 12 of the disk 13 and the sleeve 14 is so designed that the pawl 15 will be moved to the dotted line position Fig. 3, and the pawl 15 will be placed, as is evident, in engagement with one of the teeth 7 and thus lock the annular member 5 so that the wheel of the vehicle will be held against backward rotation and the vehicle against a retrograde or backward movement. In order to properly assist in the movement of the pawl 15 from engagement with the teeth 7 when the vehicle has been started forward after such stopping, a disk 18 is mounted for limited oscillation by means of the pin-and-slot 19, upon the sleeve 10 between the sleeve 14 and a portion of the shaft 9. The pin 20 carried by the disk 18 is slidable within the arc-shaped slot 21 of the pawl 15. The disk 18 will thus be allowed a slight movement without affecting the pawl 15, but should the annular member 5 be rotated in the direction of the arrow Fig. 3, the disk 13 will be rotated in the direction of its arrow (Fig. 3), due to the friction between the sleeve 10 and the hub 12. Thus the disk 18, and consequently should the pawl 14 not have been released due to the friction between the hub 12 and sleeve 14, will cause the pawl 15 to move from the dotted line position Fig. 3 to the full line therein, said pawl 15 being limited and arrested in its movement by means of the pin 17.

As is often the case, when it is desired to reverse intentionally the movement of the vehicle, and therefore not automatically actuate the present stopping device, a means must be provided whereby the pawl 15 will be held against movement due to the reverse rotation of the annular member 5, and in order to accomplish such movement, an arm 22 is carried by the shaft 9 and has connected thereto a rod 23 which is led forwardly as clearly shown in Figs. 1 and 2 and is connected to a sliding plate 24 mounted in coactive relation by means of the slots 25 and pins 26 to the control lever guiding and change quadrant 27, which is shown diagrammatically in Figs 1, 2 and 6. This plate 24 is provided with an offset 28 which is disposed in the path to be engaged by the control lever 29 of the motor vehicle, when such lever is moved into the reverse notch 29' of the quadrant 27. This action will move the plate 24 forwardly and through the rod 23 will slightly oscillate the shaft 9, and as the stub end 10 thereof is eccentric to the shaft 9, the disk 13 will be moved downwardly and out of engagement with the annular member 5 so that there is no friction contact therebetween. In order to automatically return the plate 24 and consequently the shaft 9 to normal position with the disk 13 in engagement with the friction surface 6 of the annular member 5, a spring 30 is connected to the plate 24 and to the chassis of the machine, so that as soon as the lever 29 is moved out of the reverse notch 29', the plate 24 will be moved to its normal position and consequently through the rod 23 will oscillate the shaft 9 so as to place the disk 13 in engagement with the friction disk 6 of the annular member 5 and thus place the parts in the position for automatic action due to the retrograde movement of the vehicle.

From the foregoing description, taken in connection with the drawings, it is evident that with a device of the present structure, that the same may be readily applied to motor cars now in use, and that should the engine while on an incline or in hill climbing be stalled or it becomes necessary to stop the motor car, the present device will be automatically actuated due to the slight movement of the vehicle down the grade and the pawl or arm 15 will be thrown into engagement with the ratchet teeth 7 and thus lock the car against such movement. By means of this, the engine can be started and the transmission can be selected without the necessity of holding the emergency brake, and thus running the risk of again stalling the engine should the load be too suddenly thrown thereupon.

What is claimed is:

1. In an automatic stopping device for vehicles, an annular hub carried member provided with a friction surface and a toothed surface, a friction disk disposed for coöperation with such friction surface, and a pawl operably connected to such disk and normally held out of engagement with the toothed surface, whereby a retrograde movement of the annular member will rotate the disk in an opposite direction and place the pawl in engagement with the toothed surface.

2. An automatic stopping device for vehicles, including an annular hub carried member provided with a friction surface and a toothed surface, a friction disk disposed for coöperation with said friction surface and for movement to and away therefrom, a pawl operably connected to such disk and normally held out of engagement with the toothed surface, and lever actuated means for moving the disk out of engagement with the friction surface.

3. An automatic stopping device for vehicles, including an annular hub carried member provided with a friction surface and a toothed surface, a friction disk disposed for coöperation with said friction surface and for movement to and away therefrom, a pawl operably connected to said disk and normally held out of engagement with the toothed surface, and manually actuated and spring returned means to move the disk out of engagement with the friction surface when intentionally reversing the running gear.

4. The combination with a vehicle, of an automatic stopping device therefor, including an annular hub carried member having a friction surface and a toothed surface, an oscillatory shaft hung from the running gear and having an eccentrically disposed cylindrical end, a friction disk mounted for rotation upon said end for movement into and out of engagement with the friction surface of the annular hub carried member, a pawl mounted upon the reduced end of the shaft and in coöperative relation with the disk, the normal rotation of said disk upon the friction surface of the annular member holding the pawl out of engagement with the toothed surface of the annular hub carried member, and means for limiting the movement of the pawl away from the toothed surface, whereby upon the rotation of the annular member in the opposite direction, the disk will cause the movement of the pawl into engagement with the toothed surface.

5. The combination with a vehicle, of an automatic stopping device therefor, including an annular hub carried member having a friction surface and a toothed surface, an oscillatory shaft hung from the running gear and having an eccentrically disposed cylindrical end, a friction disk mounted for rotation upon said end for movement into and out of engagement with the friction surface of the annular hub carried member, a pawl mounted upon the reduced end of the shaft and in coöperative relation with the disk, the normal rotation of the disk upon the friction surface of the annular member holding the pawl out of engagement with the toothed surface of the annular hub carried member, and spring returned means for oscillating the shaft and for retaining the disk in engagement with the friction surface of the annular member.

6. An automatic stopping device, including an annular hub carried member provided with a friction surface and a toothed surface, an oscillatory shaft provided with a reduced eccentrically disposed end, a friction disk mounted for rotation upon the said end and for engagement with the friction surface of the annular member, a pawl mounted upon said reduced end and in frictional engagement with said disk and for movement to and from the toothed surface of the annular member, said pawl being held away from the toothed surface during the normal rotation of the annular member, means for limiting the movement of the pawl away from the toothed surface of the annular member, and manually operated and spring returned means operably connected to the shaft, whereby the shaft is oscillated to move the friction disk out of engagement with the friction surface of the annular member, the spring thereof normally holding the friction disk in engagement with the friction surface of the annular member.

7. An automatic stop device, including a hub carried member, a locking device disposed in co-active relation to the hub carried member and for locking the same against a retrograde movement, a slidable plate connected to the locking device, said slidable plate being provided with a projection, a manually operated lever for engaging the projection to slide the plate and to move the locking device into hub member engagement, and a spring connected to the last mentioned plate for returning the locking device to inoperative position.

In testimony that I claim the foregoing as my own, I have hereto affixed my signature in the presence of two witnesses.

HARRY M. SPENCER.

Witnesses:
 Thos. J. Cavanaugh,
 R. N. Irvin.